United States Patent
Kuo et al.

(10) Patent No.: US 6,542,718 B1
(45) Date of Patent: Apr. 1, 2003

(54) METHOD AND APPARATUS FOR TERMINATING A BURST TRANSMISSION IN A WIRELESS SYSTEM

(75) Inventors: Wen-Yi Kuo, Morganville, NJ (US); Martin Howard Meyers, Montclair, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/408,510

(22) Filed: Sep. 30, 1999

(51) Int. Cl.⁷ .............................. H04Q 7/20; H04Q 7/34
(52) U.S. Cl. ........................ 455/69; 455/63; 455/67.3; 455/522; 455/466; 370/355; 370/351; 375/140; 375/141; 375/144
(58) Field of Search ..................... 455/69, 63, 67.4, 455/67.3, 517, 522, 422, 423, 424, 425, 453, 436, 439, 524, 466; 370/480, 496, 355, 351; 375/140, 141, 144

(56) References Cited

U.S. PATENT DOCUMENTS

| | | | |
|---|---|---|---|
| 6,324,207 B1 | * | 11/2001 | Kanterakis et al. ......... 455/522 |
| 6,341,224 B1 | * | 1/2002 | Dohi et al. ................. 455/522 |
| 6,400,929 B1 | * | 6/2002 | Ue et al. ....................... 455/69 |

* cited by examiner

Primary Examiner—William Trost
Assistant Examiner—Keith Ferguson
(74) Attorney, Agent, or Firm—Harness, Dickey & Pierce, P.L.C.

(57) ABSTRACT

In order to effectively terminate a burst transmission in a wireless system, a method and apparatus determines whether or not a burst transmission from a wireless unit to a base station should be terminated by evaluating at least one criterion related to the operation of the wireless system. Once it is determined that a burst transmission should be terminated, the transmission is terminated by lowering a target signal-to-noise ratio (SIR) by a predetermined amount. By lowering this target SIR, power control bits transmitted from the base station to the wireless unit instruct an extreme decrease in power of the burst transmission and quickly act to terminate the burst transmission.

40 Claims, 4 Drawing Sheets

METHOD AND APPARATUS FOR TERMINATING A BURST TRANSMISSION IN A WIRELESS SYSTEM

BACKGROUND OF THE INVENTION

1. Field of the Invention

The invention relates generally to wireless communication systems and more particularly to burst transmissions in a wireless system.

2. Description of Related Art

Wireless communication systems have been developed to allow transmission of information signals between an originating location and a destination location. Both analog (first generation) and digital (second generation) systems have been used to transmit such information signals over communication channels linking the source and destination locations. Digital methods tend to afford several advantages relative to analog techniques, including, e.g., improved immunity to channel noise and interference, increased capacity, and improved security of communication through the use of encryption.

First-generation analog and second-generation digital systems have been designed to support voice communication with limited data communication capabilities. Third-generation (3G) wireless systems, using wide-band multiple access technologies such as CDMA, will effectively handle a large variety of services, such as voice, video, data and imaging. Among the features to be supported by third-generation systems are the transmission of high-speed data between a mobile terminal and a land-line network. High-speed data communications are often characterized by a short transmission "burst" at a high data transmission rate, followed by some longer period of little or no transmission activity from the data source. To accommodate the bursty nature of such high-speed data services in third-generation systems, it is necessary for the communications system to assign a large bandwidth segment (corresponding to the high data rate) for the duration of the data burst from time to time.

With the ability of the third generation systems (3G) to handle such bursty high-speed data transmission, throughput and delay for users can be advantageously improved. However, because of the large amount of instantaneous bandwidth required for transmission of a burst of high-speed data, the management of such bursts, and particularly the allocation of power and system resources thereto, must be handled with care to avoid unwarranted interference with other services using the same frequency allocation. Consequently, system designers need to deal with many issues in setting efficient data rates for different types of communications via a wireless link, including appropriate allocation of system resources for the bursts of data experienced with high-speed data service.

There is a continuing need to increase the performance of communication systems by accommodating a variety of users with different data rates. In particular, there is a need to maintain transmission quality by preventing power overloading and excessive interference problems. There is a corollary need for a mechanism that improves or increases the system throughput and data rates of individual users, particularly for high-speed data, accessing a wireless communications system.

With regard to the construction and design of 3G wireless communication systems, high-speed data services must be accommodated into the wireless communication systems while maintaining spectral efficiency in the radio transmission. To achieve such results, a packet transmission mode has been introduced due to the bursty nature of the data communications. The packet transmission mode involves a burst control function which, upon receiving a request for data burst transmission, allocates the radio resources (including burst duration and burst data rate) for each single burst transmission.

One major goal of the burst control function is to insure that each burst transmission will not create excessive (intolerable) interference which may jam or otherwise negatively affect the entire system. The resource assignment for the burst may not be proper, as recognized some time after the start of the burst. Thus, premature termination of the burst may be necessary in the case where severe jamming interference arises unexpectedly. Furthermore, if the burst transmission is the reverse link, from the mobile wireless unit to the base station, this may involve a message between the base station and terminal and may cause some delay in the critical action.

The successive high-speed data services in 3G systems rely heavily on the burst control function. All wireless communication systems require frequency re-use to increase capacity. With the introduction of high-speed packet data services such as IS-95B and 3GIS-95, interference variation becomes more severe than in the case of voice only services. For voice only services, code channels are assigned to various users and every user transmits at roughly the same data rate. Some users encounter severe fading conditions and may need more power (which in turn creates more interference) in order to maintain the quality of the link between the mobile wireless unit and the base station. On the other hand, some others might be in benign conditions and may cause very little interference to others. Since the users are randomly located, the fading conditions for individual users are also random and thus CDMA systems take advantage of an averaging effect on interference.

However, the scenarios for high-speed data services are different. First, a single user can be assigned a large chunk of equivalent code channels for a short interval to serve the user's bursty data transmission need. If this assigned user happens to encounter a severe fading in the middle of the burst transmission, the associated power with the user will need to be boosted up to maintain call quality. This increase in power might further present excessive interference to all other users due to the high data rate to which it has been assigned. Also, the above-mentioned averaging effect among users is missing because a large portion of radio resources are assigned to a single user in 3G systems and this causes an equivalently higher "peak-to-averaging" interference pattern.

A second scenario involves the mobility of the wireless unit. The assigned high-speed data user may travel at a certain speed. Once it enters a handoff zone, handing off communication of the mobile wireless unit from one base station to another, the interference pattern changes significantly. The new and/or old base station may not have enough radio resources or this high-speed data user may jam other users within the new base station coverage areas.

In short, the aforementioned scenarios present needs to accurately estimate a mobile wireless unit's fading conditions and interference problems that it may cause for base stations and allocation of radio resources in burst assignments. Further, a need is created to perform strict control on the burst transmission such that interference generated by this high rate user is tolerable to other users. In practical operation, the estimation of the wireless mobile units fading and interference may not be accurate enough and the control of the interference may not be guaranteed especially when the wireless mobile unit is into a transition (add or drop) of soft handoff between base stations. Accordingly, a need exists to perform premature termination of burst transmission, in order to insure control of interference, if significant instantaneous interference rise occurs. If premature termination of burst transmission is to occur by sending a message between the mobile wireless unit and the base station, this message for termination must be transmitted quickly because the delay of action might cause significant degradation for other users on the system.

SUMMARY OF THE INVENTION

In order to effectively terminate a burst transmission in a wireless system, a method and apparatus has been developed which determines whether or not a burst transmission from a wireless unit to a base station should be terminated by evaluating at least one criterion related to the operation of the wireless system. Once it is determined that a burst transmission should be terminated, the transmission is terminated by lowering signal-to-interference ratio (SIR) by a predetermined amount. By lowering this target SIR, power control bits transmitted from the base station to the wireless unit instruct an extreme decrease in power of the burst transmission and quickly act to effectively terminate the burst transmission.

BRIEF DESCRIPTION OF THE DRAWINGS

Various aspects of the present invention will become more clearly understood through the following detailed description and drawing figures, wherein like reference numerals represent like elements and wherein.

DETAILED DESCRIPTION OF THE PREFERRED EMBODIMENTS

To effectively terminate a burst data transmission from a mobile wireless unit to a base station, conditions are set so that termination of the data burst will be fast and effective. More specifically, an upper limit of a tolerable signal-to interference ratio (SIR) for a base station is determined upon receiving a request from a wireless mobile unit, (a burst request). A target signal-to-interference ratio (SIR) between the wireless mobile unit and the base station is automatically adjusted by a power control outer loop (an algorithm is used to set the target SIR based upon a frame error rate (FER) of the signal from the wireless mobile unit meeting a target FER) and when the target SIR exceeds the upper limit of an tolerable SIR, above which interference is unacceptable or intolerable, the target SIR is intentionally lowered so that the burst transmission is effectively terminated. In effect, the offsetting of the target SIR of the present invention breaks the normal function of power control outer loop as will be explained hereafter.

Figure 1:
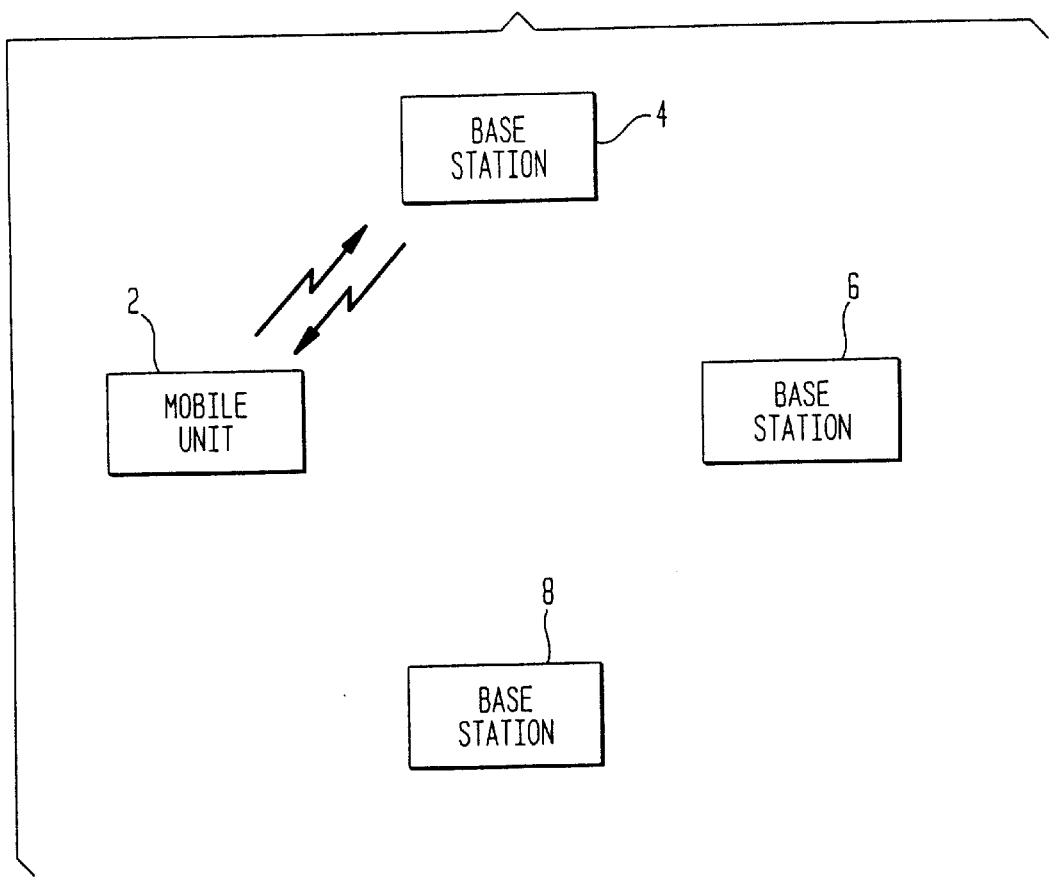
FIG. 1 illustrates a wireless system of the present invention, including a mobile unit and a plurality of base stations.

FIG. 1 illustrates a wireless communication system including a wireless mobile unit 2, a first base station 4 acting as the current primary base station for a wireless mobile unit 2, and neighboring base stations 6 and 8.

Figure 2:
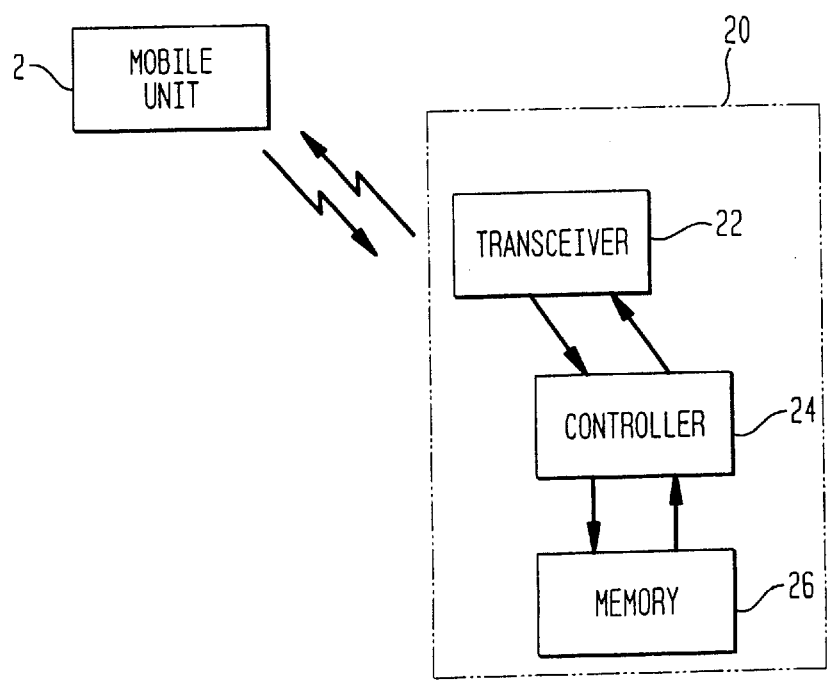
FIG. 2 illustrates an apparatus of the present invention.

FIG. 2 illustrates the wireless mobile unit 2 in communication with the apparatus 20 of the present invention. This apparatus is preferably located at a base station, such as primary base station 4 shown communicating with wireless mobile unit 2 in FIG. 1 of the present application.

The apparatus 20 includes a transceiver 22, connected to a controller 24. The controller 24 is connected to a memory 26. The transceiver 22, controller 24, and memory 26 may be located within the apparatus 20 as shown in FIG. 2, or may be located within existing hardware of a standard base station, such as base station 4 for example.

The transceiver 22 transmits and receives signals from the wireless mobile unit 2, including burst data transmissions sent from the mobile unit 2 to the apparatus 20 of the base station 4, and power control bits sent at a very high rate, such as 800 Hz for example or higher, from the apparatus 20 of the base station 4 to the wireless mobile unit 2 via a signaling channel. These power control bits instruct the wireless mobile unit 2 to power up or power down (in a finite step size, for example, such as 1 dB) based upon measurements in the transceiver 22 every power control group (pcg) time (such as 1.25 ms for example). This is known as an inner loop function wherein transmit power is adjusted such that a received SIR of a data burst transmission is adjusted to meet a target SIR. The target SIR will be explained later.

In an outer loop function (occurring every 20 ms for example) the target SIR of a received data burst transmission is adjusted. It is adjusted to ensure a desired or target quality level, expressed in terms of frame-error rate (FER), such that an outcome FER meets a target FER. Within this outer loop control function, transmit power is adjusted in the inner loop function. Further, a comparison of the target SIR and an upper SIR bound, above which interference is intolerable and a data burst transmission must be terminated, is made. The determination of this SIR bound and the injection of the target SIR/upper bound SIR comparison will become clearer from the description of FIG. 3.

Figure 3:
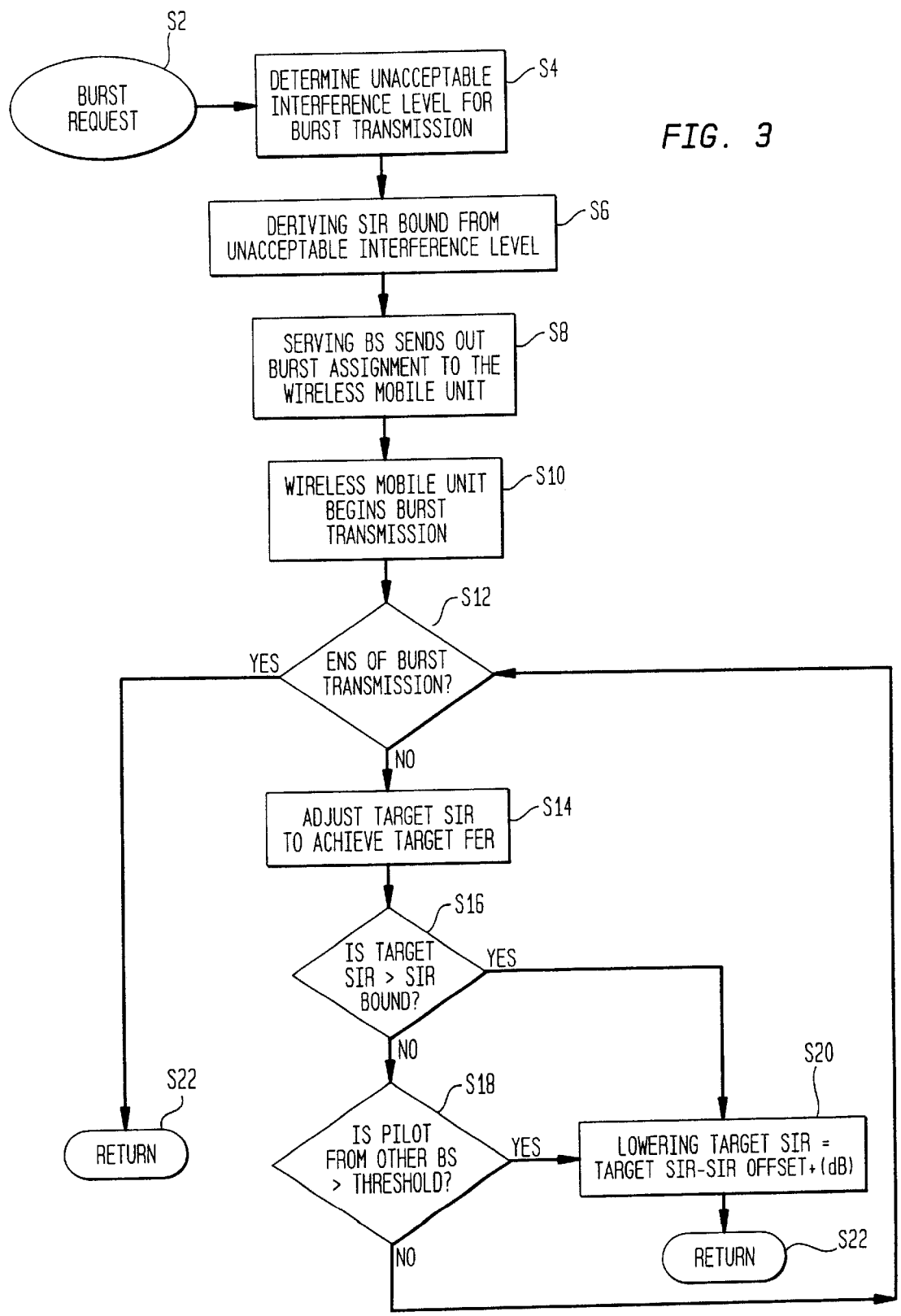
FIG. 3 is a flowchart illustrating the methodology for burst signal transmission and termination according to the present invention.

FIG. 3 illustrates a method of a preferred embodiment of the present application. Initially, in Step S2, a request to handle a data burst transmission (burst request) is sent from a wireless mobile unit, such as wireless mobile unit 2 for example, to its primary or serving base station 4 for example. The base station 4 will assign or allocate radio resources (including burst duration and burst data rate) for the data burst transmission. However, in Step S4, before a burst assignment is sent to the wireless mobile unit 2, the serving base station 4 (preferably in conjunction with neighboring base stations 6 and 8), estimates interference which will be caused by a data burst transmission from the wireless mobile unit 2. This can be done as follows.

A percentage of overall interference (i) (toward a total amount of interference that a base station 4 can tolerate) that a burst transmission from wireless mobile unit 2 generates, is determined by the following equation:

$$i = \rho \cdot (Eb/I) \cdot r/\omega \qquad (1)$$

In the aforementioned equation (1), $\rho$ is a channel activity factor. This ranges from 0–1.0, and typically has a value of 0.5 for voice and 1.0 for data. $E_b$ is the energy per bit of the signal and I is the total interference. $E_b/I$ is equal to the SIR. The symbol "r" corresponds to the transmission rate and $\omega$ is the spreading bandwidth (typically 1.25 megahertz, a predetermined value). The ratio $r/\omega$ is the inverse of the spreading gain of the signal.

In the aforementioned equation (1), 5% (0.05) or 10% (0.10) of the total interference tolerable by the serving base station 4 (the total capacity) is generated by a given mobile unit, such as wireless mobile unit 2. The total tolerable interference of serving base station 4 for all mobiles it is servicing is known based upon its components and history for example. For exemplary purposes, a number such as 100% capacity is assumed (the 100% representing a value of the total tolerable interference, i.e. the total capacity). The other mobiles already being serviced by base station 4 may generate 85% (0.85) of the 100% total tolerable interference, for example. Thus, a maximum of 15% (0.15) interference from wireless mobile unit 2 is all that can be tolerated by the serving base station 4 without exceeding its capacity.

The base stations, or base station 4 taken alone, thus determine a highest data rate that the wireless mobile unit 2 can be assigned so that interference generated is still tolerable, noting that interference is roughly proportional to the data rate. The estimation of SIR for the data channel is based on a history of the operating signal-to-interference ratio (SIR) of the control channel or fundamental channel of the wireless mobile unit 2, and can be stored in memory 26 of the apparatus 20 for example.

In Step S4, the base station 4 taken alone, or in conjunction neighboring base stations 6 and 8, determines the unacceptable interference level for burst transmission. This will be explained as follows.

In equation (1), if the maximum tolerable interference for wireless mobile unit 2 is 15% (0.15), for example, i becomes 0.15. Further, $\rho$ is 1 (for data in a 3G system); $\omega$ is known (fixed by a chip rate); and SIR is known (it is set as a target SIR, a maximum SIR that will ensure a desired or target quality level, expressed in terms of FER such that an outcome FER meets a target FER). Thus, equation (1) can be solved for "r" to determine a transmission rate corresponding to the maximum tolerable interference (for the wireless mobile unit) of 0.15.

Once "r" is determined, then equation (1) is again used. This time, an intolerable total interference value of 110% (1.1), for example, is used (one which is higher than the total tolerable level of 100% or the total capacity). The other mobiles generate 85% (0.85) of the intolerable 110% (1.1), and thus the intolerable interference for wireless mobile unit 2 is 25% (0.25). Thus, in equation (1), i=0.25. Since "r" is now known; $\omega$ is known; and $\rho=1$, the equation can be solved for SIR ($E_b/I$). Thus, in step S6, such an upper bound of the operating SIR (SIR ($E_b/I$)), or the SIR bound is derived.

Accordingly, SIR ($E_b/I$) or SIR bound is a threshold SIR level above which interference is not tolerable. In essence, an unacceptable interference level essentially defines an upper bound of the operating SIR. Above this SIR bound, interference generated by a burst transmission is not tolerable, and a premature termination must be implemented.

As previously stated, the SIR bound can be calculated from the base station 4 taken alone, or in conjunction with neighboring base stations 6 and 8 for example. In such an instance, with the wireless mobile unit 2 within reach of both base stations 4 and 6, for example, each will detect an SIR for the wireless mobile unit 2, such as 5 dB and 3 dB for example. Each will have tolerable interference thresholds, such as a relative number like 100%, for example. The existing interference load on each base station, based on other mobiles that each is servicing, may differ (one may be handling 75% of its 100% capacity, allowing an interference value of 25% for the wireless mobile unit 2 and the other may be at 95% capacity, allowing an interference value of 5% for the wireless mobile unit 2). Thus, at each of base stations 4 and 6, i may differ and SIR may differ; $\omega$ is known; $\rho=1$, and thus an "$r_1$" for base station 4 can be determined from equation (1) and an "$r_2$" for base station 6 can be determined from equation (1).

From the determined transmission rates $r_1$ and $r_2$, the rate is chosen which ensures that both interference calculations stay within their allowable ranges. Using this chosen rate, and an intolerable interference value of 110% capacity (1.1)(for example), an upper bound of an SIR can be calculated in the manner described previously. These calculations are performed in controller 24, with signals being received and output through transceiver 22 and using information stored in memory 26. Further, similar calculations can be performed using 3 or more base stations in the manner described previously.

Thereafter, in Step S8, the serving base station 4 sends out a burst assignment to the wireless mobile unit 2 allocating ratio resources and assigning a burst duration and burst data rate for data burst transmission. Thereafter, in Step S10, the wireless mobile unit 2 begins data burst transmission. In Step S12, it is determined whether or not the end of the data burst transmission has been reached. If so, in Step S22, the system returns to Step S2 and awaits another data burst transmission request.

If the end of the data burst transmission is not complete, the system moves from Step S12 to Step S14. In Step S14, during the data burst transmission, the apparatus 20 of the base station 4 automatically adjusts target SIR of the data burst transmission based on existing RF conditions of the transmission, to achieve a target frame error rate (FER). This is done in a known manner as part of the outer loop function.

During transmission of the data burst, there may be severe fading and the associated power may need to be boosted or controlled to maintain quality. Thus, within the outer loop function, an inner loop power control process occurs between the base station 4 and wireless mobile unit 2. While the data burst is being transmitted, an SIR of the data burst transmission is detected at the base station 4. This received SIR is compared (every 1.25 ms for example) to a target SIR, set during power control to achieve the target FER (for example 1%). Power control bits are transmitted from the base station 4 to the wireless mobile unit 2, instructing an increase in power of the burst transmission if the received SIR is less than the target SIR and a decrease in power of the burst transmission if the received SIR is greater than or equal to the target SIR, based upon the comparison.

This inner loop process continues to adjust the transmit power to make the received SIR equal the target SIR every 1.25 ms, for example. However, since a power boost may also create excessive interference, this must also be monitored. Thus, an additional step is inserted in the outer loop function to terminate the data burst transmission when interference is excessive, as will be explained hereafter.

Specifically, in Step S16, it is determined whether or not the target SIR is greater than the previously determined SIR bound. In other words, it is determined whether or not the target SIR (a stable value approximately equal to the received SIR of the data burst transmission) now exceeds the SIR bound, indicating that the interference is above an acceptable level and premature termination is needed. If so, the method proceeds to Step S20.

In Step S20, the target SIR is intentionally lowered by a predetermined amount necessary to trigger termination of the burst transmission. This predetermined amount, SIR offset, is for example 10 dB. Power control bits are sent from the base station to the wireless mobile unit 2 instructing this extreme decrease in power. By intentionally lowering the target SIR by such a large amount, the interference caused by the burst transmission is immediately reduced by that amount, effectively terminating the burst transmission in Step S20. The system then returns in Step S22 to Step S2.

If the target SIR is not determined to be greater than the unacceptable interference in Step S16, the method proceeds to Step S18. In this step, it is determined whether or not a pilot signal of another base station is greater than a predetermined threshold. In other words, it is determined whether or not the pilot signal from another base station, which was not initially involved in the interference evaluation of the data. burst assignment exceeds predetermined threshold. For example, it is determined whether or not the following equation is satisfied in a manner known to those of ordinary skill.

$$Ec/I_o > T_{add} \qquad (2)$$

In equation (2), Ec is the energy per chip, and $I_o$ is the interference density. By such a ratio exceeding such a threshold ($T_{add}$), this indicates that the wireless mobile unit 2 is moving closer to the new found base station and a premature termination of the data burst transmission is needed to prevent jamming of the new base station. If not, the system returns to Step S10.

The method shown in FIG. 3 is carried out by the components of FIG. 2 as would be understood by one of ordinary skill. The components include transceiver 22 for receiving and outputting signals; controller 24 for performing calculations and determinations; and memory 26 for storing old, new and updated information.

Accordingly, by the method shown in FIG. 3, two major issues which seriously threatened a system's stability are addressed. First, if the actual operating SIR is significantly deviated from the estimated SIR due to environmental change for example, unacceptable interference will be generated. Second, the wireless mobile unit 2 may significantly move away from the original location, thus creating excessive interference to other base stations that were not involved in the interference evaluation before the data burst assignment. These two problems are addressed and solved by the method shown in FIG. 3 wherein, when the target SIR is greater than the SIR bound (or by determining that a pilot signal from another base station is greater than a predetermined threshold) the aforementioned problems can be solved and data burst transmission can be effectively terminated.

Lowering the target SIR to lower the transmission power of the data burst transmission, to effectively terminate the data burst transmission itself, can be used anytime data burst transmissions need to be terminated. Other ways to detect when a data burst should be terminated are as follows. It should be noted that once it is determined that a data burst transmission must be terminated, by any of the following methods, then the data burst transmission is terminated by the process set forth above.

Burst assignment (i.e., bandwidth/power allocation provided to user for anticipated data burst) is based on the user's history and contemporaneous conditions at the time of assignment. Such contemporaneous conditions can change very rapidly, even within the time frame of the burst transmission. As a result of such change, a given burst assignment may become inappropriate sometime after the assignment. For instance, the power needed to achieve a desired FER may be unavailable due to preexisting loading of the system transmission resources by other users in the same cell. Additionally, the achieved FER may go higher than the level required during a long burst duration, particularly if the user is highly mobile. Moreover, fading conditions, which negatively affect transmission quality, particularly in an urban user environment, may change the power loading conditions, as well as the achievable FER, within the duration of the burst transmission. As a result, continuation of the burst assignment unnecessarily wastes power capacity and system resources. Data rates and throughput suffer as well. Overall data transfer in the forward link may encounter power overloading problems, whereas data transfer in the reverse link may encounter excessive interference.

In a wireless system established to provide high data-rate burst transmissions, the amount of transmission power required for such a burst transmission will often represent a significant portion of the total transmission power available to the transmitting station handling the burst. Thus, the transmission requirements of a single high data-rate user, which may consume a significant amount of transmission power, can lead to overloading problems. Particularly, for a reverse-link burst transmission, such a high data-rate (and high power) user may generate significant interference which negatively affects other reverse link users in the same physical proximity.

To address these concerns for the case where a continuation of the burst may no longer be appropriate (as discussed above), intelligent criteria are provided for determining when a data burst must be prematurely terminated in the reverse link in a wireless communication system. The method operates to establish and act upon premature burst termination criteria in respect to an interference overload in the reverse link, occurrence of an unacceptable FER (or alternatively, the ARQ-NACK rate), and an apparent loss or termination of the user's input signal. It will, however, be apparent to those skilled in the art that other such criteria could be chosen and all such criteria are intended to be within the scope of the invention.

Figure 4:
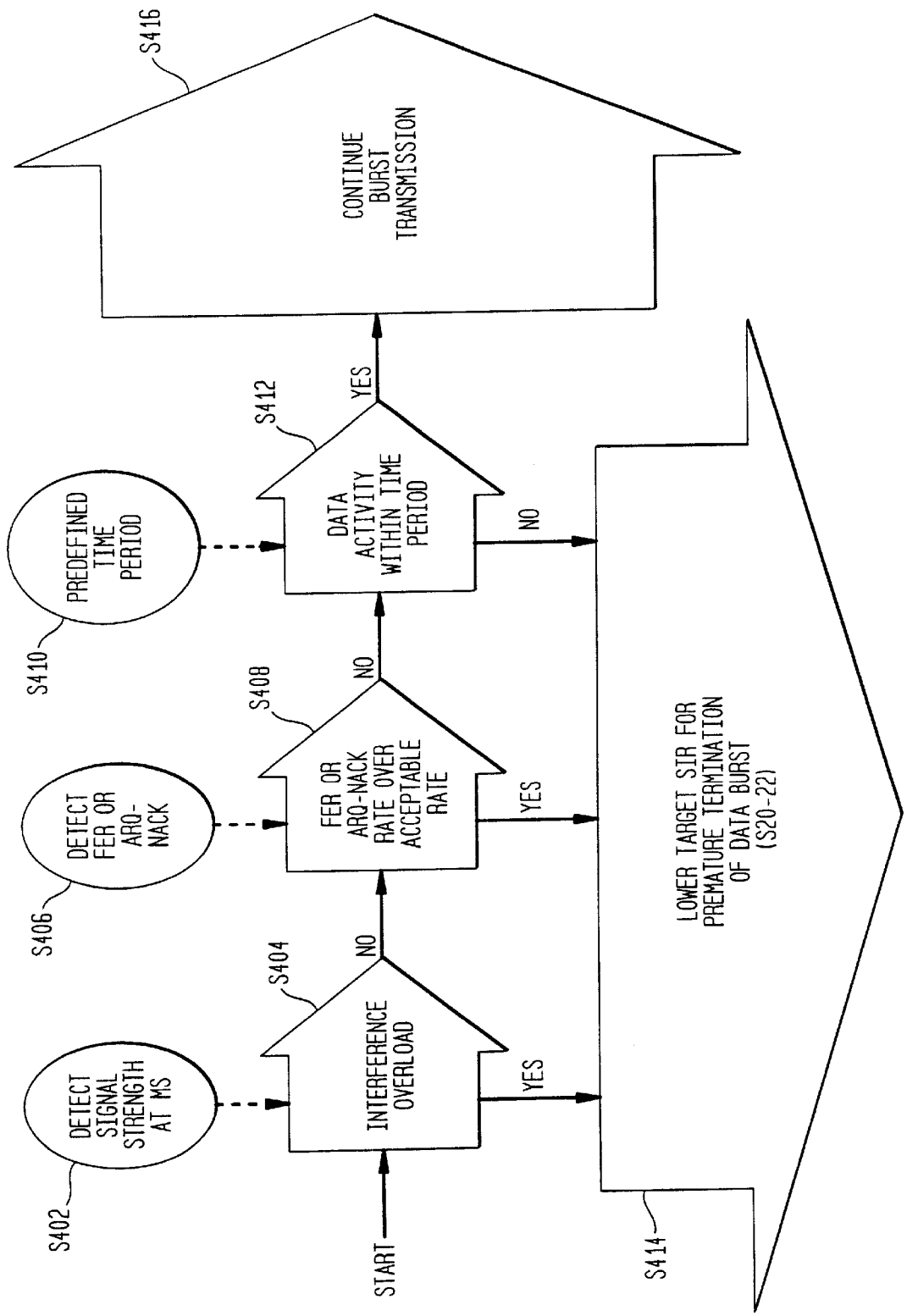
FIG. 4 is a flow diagram illustrating a methodology of determining when premature termination of a data burst is generally desirable.

A high level depiction of the methodology detecting when premature burst termination is desired is shown in FIG. 4. As can be seen from the figure, while the burst transmission is in progress, the system monitors loading conditions and detects signal strength in Step S402 at the wireless mobile unit 2 (MS) and checks for any interference overload in Step S404. If an interference overload is detected, the target SIR is lowered and the data burst is prematurely terminated in Step S414. If the overloading test is satisfied, the system checks the FER (detected in Step S406) against an acceptable rate in Step S408.

An alternative is to check the frame retransmission request (ARQ-NACK) rate against the acceptable rate. If the FER or ARQ-NACK rate exceeds the acceptable rate, then the target SIR is lowered and the data burst is prematurely terminated in Step S414. If the FER (or ARQ-NACK rate) test is satisfied, the system monitors data activity for a predefined time period (S410) to see if there is transmission activity during a known time period in Step S412. If no data transmission activity is detected during the known time period, the target SIR is lowered and the burst transmission is prematurely terminated in Step S414. If not, the burst transmission continues in Step S416 until the end of its assigned duration. It is noted that the order of application of these criteria is not important to the method and scope of the invention. The order presented herein is merely exemplary.

Referring to Steps S404, S408, and S412 in FIG. 4, the specific criteria for premature burst termination according to the illustrated embodiment of the invention, as well as the detection of such criteria, will be better understood in connection with the following further description. Once a burst assignment has been made and the data source is transmitting, the relevant BSC (base station controller or equivalent device) monitors the status of the assignment and causes premature burst termination based on the detection of transmission events which implicate one or more burst termination criteria. For the illustrated embodiment of the invention, those criteria are:

1. An overload is detected at any serving base station in communication with one or more high data-rate users. In the reverse link, a detected overload may be interference overloading in the transmission path. In the event more than one high data-rate user is operating in a cell at a time when such an interference overload is detected, user-defined selection criteria would be applied to select one of such multiple users to terminate. Obvious prioritizations would include selection of either the highest data-rate user or the lowest data-rate user (assuming the transmission power to be recovered by termination of the lowest data-rate user were sufficient to overcome the interference overload condition). Other such choices will be apparent to those skilled in the art.
2. The FER or the ARQ-NACK rate exceeds an acceptable value. In defining such an acceptable ARQ-NACK rate, the following relation would normally be applied:

NACK rate=Number of NACKs/Observation_Window>Acceptable_NACK where NACK stands for negative acknowledgement, and Observation_Window is a particular frame or a particular number of frames.

3. No data transmission activity is detected for an assigned burst transmission link during a known time period.

Note that as long as any one of these criterion is met, the premature termination of the burst transmission is performed by lowering the target SIR as described above.

Figure 5:
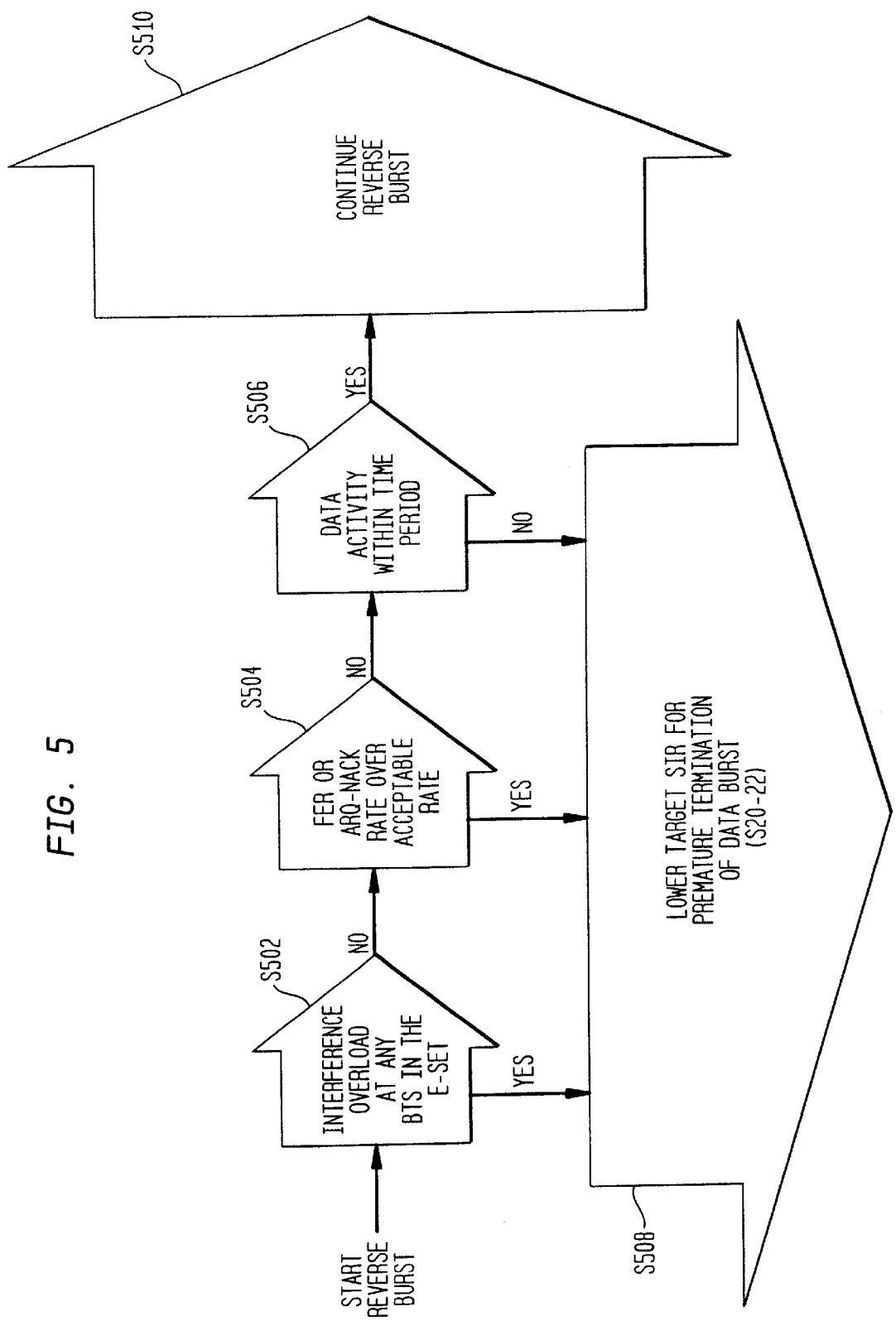
FIG. 5 is a flow diagram illustrating a methodology of determining when premature termination of a data burst is generally desirable for reverse link data burst transfers.

A specific embodiment of the method for prematurely terminating a reverse burst transmission is illustrated in block diagram form in FIG. 5. Application of the method of the invention to a reverse burst transmission is similar to the general methodology of the invention as depicted in FIGS. 3 and 4. Referring specifically to the case of interference overload detection for a reverse burst transmission, as shown in FIG. 5, the system monitors and detects, in Step S502, the relative signal strength at the MS with respect to any base station in a monitored set of base stations in communication (or potentially in communication) with that user. That monitored set of base stations may be the active set of base stations for that user. Other base station sets can, however be chosen, for example the reverse evaluation set (e-set) of base stations. If any base station in the monitored-set exhibits interference overload conditions, the burst transmission is terminated, as in Step S508. Similarly, if the FER or ARQ-NACK rate is over that which is acceptable (as determined in Step S504) or if data activity is not determined within a predetermined period of time (Step S506), the target SIR is lowered and the forward burst transmission is terminated. If not, forward burst transmission continues in Step S510.

Those skilled in the art will recognize that there are many configurations of wireless systems not specifically described herein but for which the methodology of the invention may be applied. Although the invention is described in its preferred embodiments, it is not intended to limit the invention to the precise embodiments disclosed herein. In particular, the invention can be utilized for third-generation mobile or personal communication systems that offer a multitude of data services in different operating scenarios, such as telephony, teleconference, voice mail, program sound, video telephony, video conference, remote terminal user profile editing, telefax, voiceband data, database access, message broadcast, unrestricted digital information, navigation, location and Internet downloading services. The methodology for detecting the need for premature burst termination, and for terminating burst transmissions in the invention can also be utilized in second-generation systems, or any system that has burst transmission capability. Accordingly, this description is to be construed as illustrative only. Those skilled in this technology can make various alterations and modifications without departing from the scope and spirit of this invention. Therefore, the scope of the invention shall be defined and protected by the following claims and their equivalents. The invention is to be accorded the widest scope consistent with the principles and novel features disclosed herein. The exclusive use of all modifications within the scope of the claims is reserved.

We claim:

1. A method for terminating a burst transmission from a wireless mobile unit to a base station comprising:
   adjusting power of the burst transmission upon a signal-to-noise ratio (SIR) of the burst transmission differing from a target SIR;
   adjusting the target signal-to-noise ratio (SIR) during the burst transmission;
   comparing the adjusted target SIR to an operating SIR above which an interference level for the burst transmission is unacceptable;
   lowering the target SIR upon the adjusted target SIR being greater than the determined unacceptable operating SIR; and
   terminating the burst transmission upon the adjusted target SIR being lowered.

2. The method of claim 1, wherein the target SIR is adjusted by the base station.

3. The method of claim 1, wherein the target SIR is adjusted such that the burst transmission achieves a desired frame error rate (FER).

4. The method of claim 1, wherein the step of adjusting power includes;
   transmitting power control bits from the base station to the wireless unit, instructing an increase or decrease in power of the burst transmission, based upon the received SIR differing from the target SIR.

5. The method of claim 4, wherein the step of terminating includes transmitting power control bits from the base station to the wireless mobile unit instructing a decrease in power and termination of the burst transmission upon the target SIR being lowered by an amount necessary to trigger termination.

6. The method of claim 1, further comprising the step of:
   determining the unacceptable operating SIR from a previously determined unacceptable interference level for the burst transmission.

7. The method of claim 1, wherein the adjusting power step further comprises:

detecting an SIR of the burst transmission at the base station;

comparing the detected SIR to the target SIR; and transmitting power control bits from the base station to the wireless unit, instructing an increase or decrease in power of the burst transmission, based upon the comparison.

8. The method of claim 7, wherein the step of terminating includes transmitting power control bits from the base station to the wireless unit instructing a decrease in power and termination of the burst transmission upon the target SIR being lowered by an amount necessary to trigger termination.

9. The method of claim 1, wherein the step of terminating includes transmitting power control bits from the base station to the wireless unit instructing a decrease in power and termination of the burst transmission upon the target SIR being lowered by an amount necessary to trigger termination.

10. The method of claim 6, wherein the step of determining the unacceptable operating SIR includes, determining an estimated interference for a burst transmission from the wireless unit to the base station; and determining the unacceptable interference level based upon the estimated interference.

11. The method of claim 10, wherein the estimated interference is determined by the base station and neighboring base stations.

12. The method of claim 7, wherein the target SIR is initially set such that the burst transmission achieves a target frame error rate (FER).

13. The method of claim 6, wherein the unacceptable interference level is preset based upon an operating signal-to-interference ratio (SIR) of the wireless unit.

14. The method of claim 7, wherein the unacceptable interference level is preset based upon an operating signal-to-interference ratio (SIR) of the wireless unit.

15. The method of claim 1, wherein the burst transmission is alternately terminated upon detecting that a signal of another base station exceeds a threshold.

16. The method of claim 15, wherein the step of terminating includes transmitting power control bits from the base station to the wireless unit instructing a decrease in power and termination of the burst transmission upon the target SIR being lowered by an established amount or upon detecting that a signal from another base station exceeds the threshold.

17. A method for terminating a burst transmission in a wireless system including at least one base station, comprising:

lowering a target signal-to-noise ratio (SIR) of a burst transmission from a wireless unit to a base station, initially determined so that the burst transmission achieves a desired frame error rate (FER), by an amount necessary to trigger termination upon determining that the burst transmission should be terminated; and terminating the burst transmission upon the target SIR being lowered.

18. The method of claim 17, further comprising the step of:

determining whether or not the burst transmission should be terminated by evaluating at least one criterion related to operation of the wireless system.

19. The method of claim 18, wherein the step of determining includes, detecting signal power of the burst transmission from the wireless unit and the base station; and determining that the burst transmission should be terminated upon detecting signal power overload of the burst transmission.

20. The method of claim 19, wherein the step of terminating includes transmitting power control bits from the base station to the wireless unit instructing a decrease in power and termination of the burst transmission upon the target SIR being lowered by the amount necessary to trigger termination.

21. The method of claim 19, further comprising:

detecting an SIR of the burst transmission at the base station;

comparing the detected SIR to the target SIR; and transmitting power control bits from the base station to the wireless unit, instructing an increase or decrease in power of the burst transmission, based upon the comparison.

22. The method of claim 18, wherein the step of determining includes, detecting an FER of the burst transmission; and determining that the burst transmission should be terminated upon the detected FER being greater than an acceptable FER.

23. The method of claim 17, wherein the step of terminating includes transmitting power control bits from the base station to the wireless unit instructing a decrease in power and termination of the burst transmission upon the target SIR being lowered by the amount necessary to trigger termination.

24. The method of claim 23, further comprising:

detecting an SIR of the burst transmission at the base station;

comparing the detected SIR to the target SIR; and transmitting power control bits from the base station to the wireless unit, instructing an increase or decrease in power of the burst transmission, based upon the comparison.

25. The method of claim 18, wherein the step of determining includes, detecting for data activity over a period of time; and determining that the burst transmission should be terminated upon failing to detect any data activity in the period of time.

26. The method of claim 25, wherein the step of terminating includes transmitting power control bits from the base station to the wireless unit instructing a decrease in power and termination of the burst transmission upon the target SIR being lowered by the amount necessary to trigger termination.

27. The method of claim 26, further comprising:

detecting an SIR of the burst transmission at the base station;

comparing the detected SIR to the target SIR; and transmitting power control bits from the base station to the wireless unit, instructing an increase or decrease in power of the burst transmission, based upon the comparison.

28. A method for terminating a burst transmission in a wireless system including at least one base station comprising:

determining an operating signal-to-noise ratio (SIR) above which an interference level for a burst transmission from a wireless unit to the base station is unacceptable;

adjusting a target SIR during the burst transmission;

comparing the adjusted target SIR to the determined unacceptable operating SIR during the burst transmission;

lowering the target SIR by a predetermined amount upon the comparison indicating that the detected target SIR is greater than the determined unacceptable operating SIR; and terminating the burst transmission upon the target SIR being lowered by the predetermined amount.

29. The method of claim 28, wherein the target SIR is adjusted by the base station.

30. The method of claim 28, wherein the target SIR is adjusted such that the burst transmission achieves a predetermined frame error rate (FER).

31. The method of claim 28, further comprising:

transmitting power control bits from the base station to the wireless unit, instructing an increase or decrease in power of the burst transmission, based upon the adjusted target SIR.

32. The method of claim 28, wherein the step of terminating includes transmitting power control bits from the base station to the wireless unit instructing a decrease in power and termination of the burst transmission upon the target SIR being lowered by the predetermined amount.

33. The method of claim 28, wherein the unacceptable SIR is determined by first determining an unacceptable interference level for the burst transmission.

34. An apparatus for terminating a burst transmission in a wireless system including at least one base station, comprising:

a memory, adapted to store an operating signal to noise ratio (SIR) of the base station, above which an interference level for a burst transmission from a wireless mobile unit to the base station is unacceptable;

a controller adapted to adjust a target SIR during the burst transmission, compare the adjusted target SIR to the unacceptable operating SIR during the burst transmission and adapted to lower the target SIR by an amount necessary to trigger termination of the burst transmission upon the comparison indicating that the detected target SIR is greater than the determined unacceptable operating SIR; and an output device, adapted to terminate the burst transmission upon the target SIR being lowered by the amount necessary to trigger termination.

35. The apparatus of claim 34, wherein the controller is adapted to adjust the target SIR such that the burst transmission achieves a desired frame error rate (FER).

36. The apparatus of claim 34, wherein the output device is adapted to output power control bits to the wireless mobile unit, instructing an increase or decrease in power of the burst transmission, based upon the adjusted target SIR.

37. The apparatus of claim 34, wherein the output device is adapted to output power control bits to the wireless mobile unit, instructing a decrease in power and termination of the burst transmission upon the target SIR being lowered by the amount necessary to trigger termination.

38. The apparatus of claim 34, wherein the controller is adapted to determine the unacceptable operating signal-to-interference ratio (SIR) by first determining an unacceptable interference level for the burst transmission, wherein the determined unacceptable operating SIR is stored in the memory.

39. The apparatus of claim 38, wherein the controller is adapted to determine an SIR of the burst transmission at the base station, and is further adapted to compare the detected SIR to the target SIR; and wherein the output device is adapted to transmit power control bits to the wireless mobile unit, instructing an increase or decrease in power of the burst transmission, based upon the comparison.

40. The apparatus of claim 39, wherein the output device is adapted to output power control bits to the wireless mobile unit, instructing a decrease in power and termination of the burst transmission upon the target SIR being lowered by the amount necessary to trigger termination.

* * * * *